H. A. ROBINSON.
AIR PURIFIER.
APPLICATION FILED JUNE 5, 1908.

923,444.

Patented June 1, 1909.
3 SHEETS—SHEET 1.

H. A. ROBINSON.
AIR PURIFIER.
APPLICATION FILED JUNE 5, 1908.

923,444.

Patented June 1, 1909.

3 SHEETS—SHEET 3.

UNITED STATES PATENT OFFICE.

HARRY A. ROBINSON, OF CHICAGO, ILLINOIS.

AIR-PURIFIER.

No. 923,444.    Specification of Letters Patent.    Patented June 1, 1909.

Application filed June 5, 1908. Serial No. 436,874.

*To all whom it may concern:*

Be it known that I, HARRY A. ROBINSON, a citizen of the United States, residing at Chicago, in the county of Cook and State of Illinois, have invented certain new and useful Improvements in Air-Purifiers, of which the following is a specification.

My invention relates to air purifiers, and has reference more particularly to that type of air purifiers or washers wherein the air is caused to travel across the path of a shower or spray of water by which the particles of dust and dirt in the air are caught and carried away by the water, thus leaving the air in a pure and moistened state.

The principal objects of my invention are to provide an improved apparatus of this character of a simple and economical construction, and possessing a high efficiency for its intended purpose.

A leading feature of the invention resides in the provision of a device for showering or spraying the water across the path of the body of air, this device consisting of a perforated plate wherein the apertures are so arranged relatively to the length of the plate and the underlying passage traversed by the air that all the particles of air drawn or forced through the washing or purifying chamber of the apparatus are caused to come in contact with one or more falling streams of water.

Other features of the invention reside in the provision of water seals at the water inlet and outlet of the purifying chamber, and the provision of a pan to constitute the bottom or floor of the washing chamber to maintain a body of water onto which the shower falls, thus deadening and lessening the noise produced by the showering of the water through the purifying chamber. Above said pan I also preferably locate a screen onto which the shower falls, this screen also contributing to the deadening and lessening of the noise.

Still other features of the invention will be apparent from the following description of the apparatus which I have chosen to illustrate the same.

My invention will be readily understood when considered in connection with the accompanying drawings which illustrate a practical mechanical embodiment thereof, and in which,—

Figure 1:
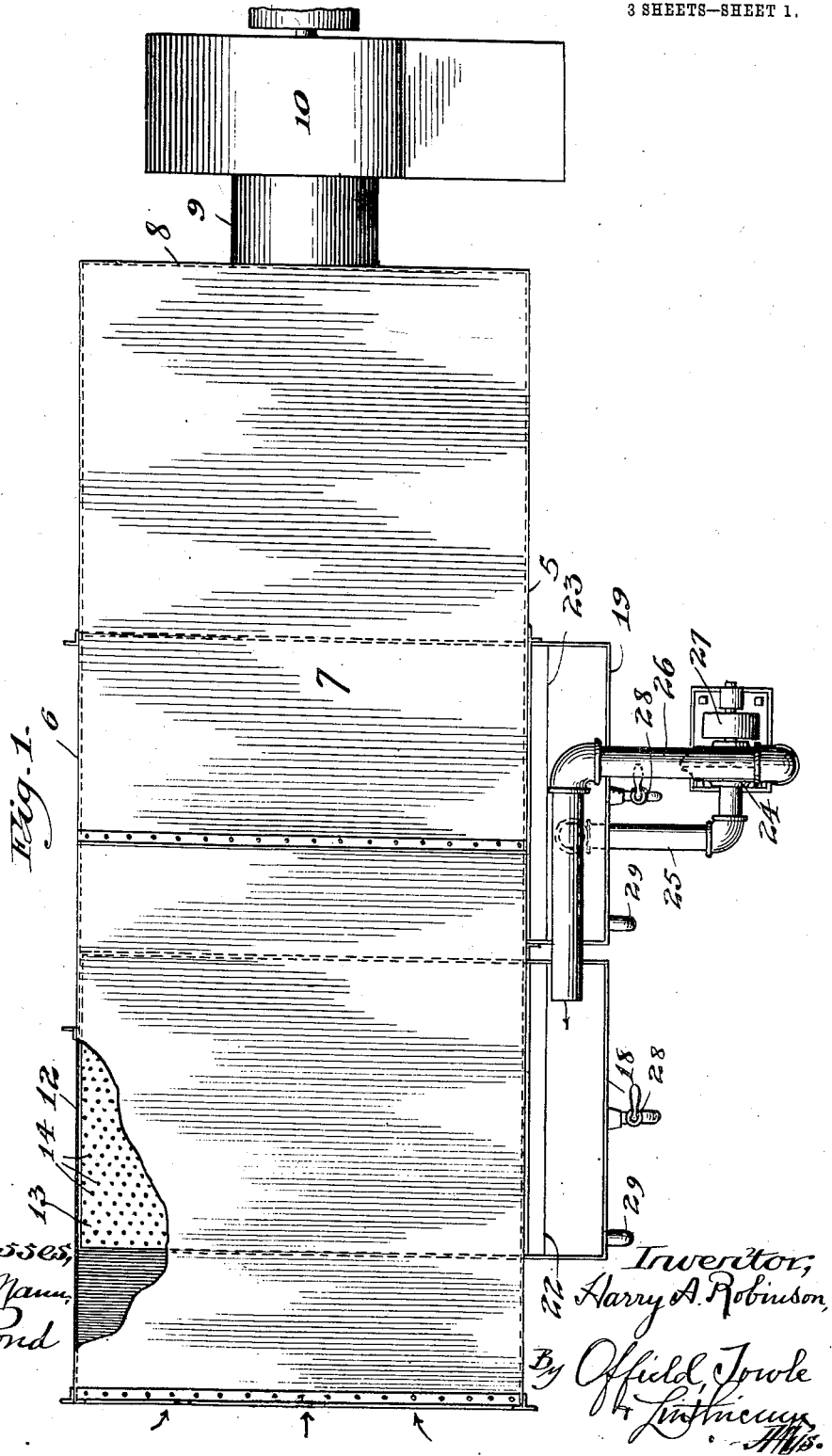
Figure 2:
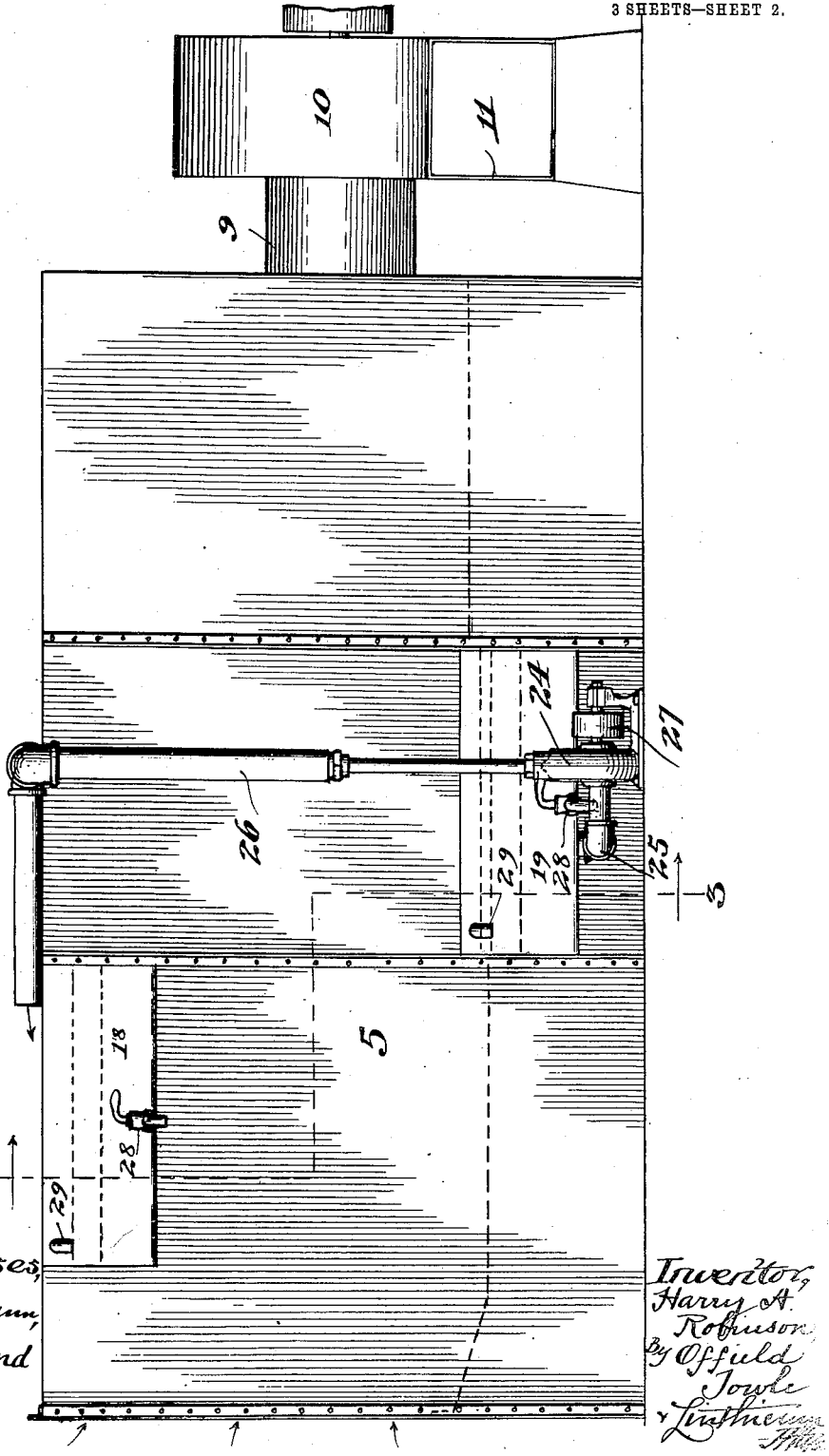
Figure 3:
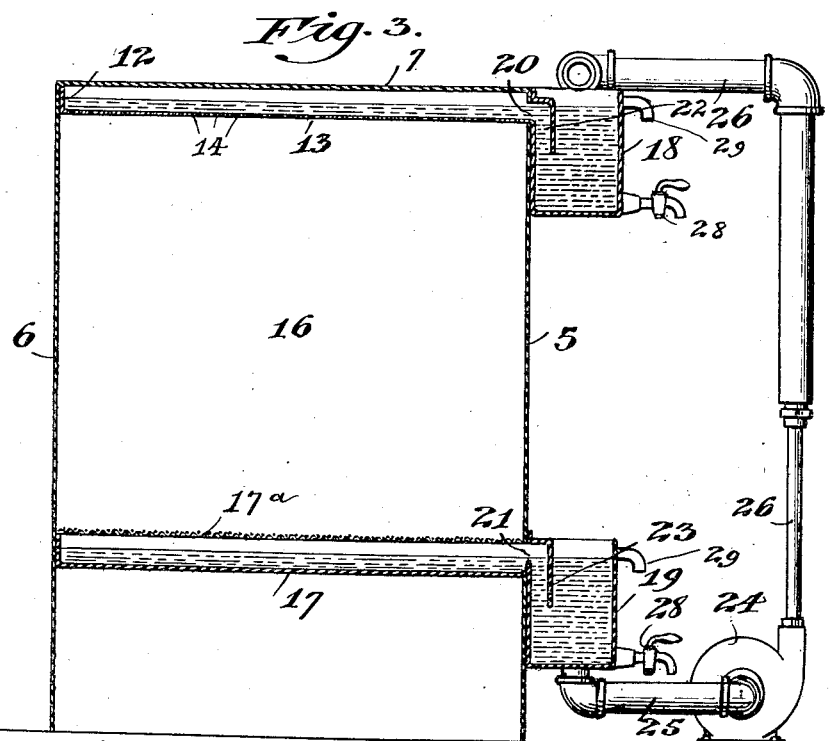
Figure 4:
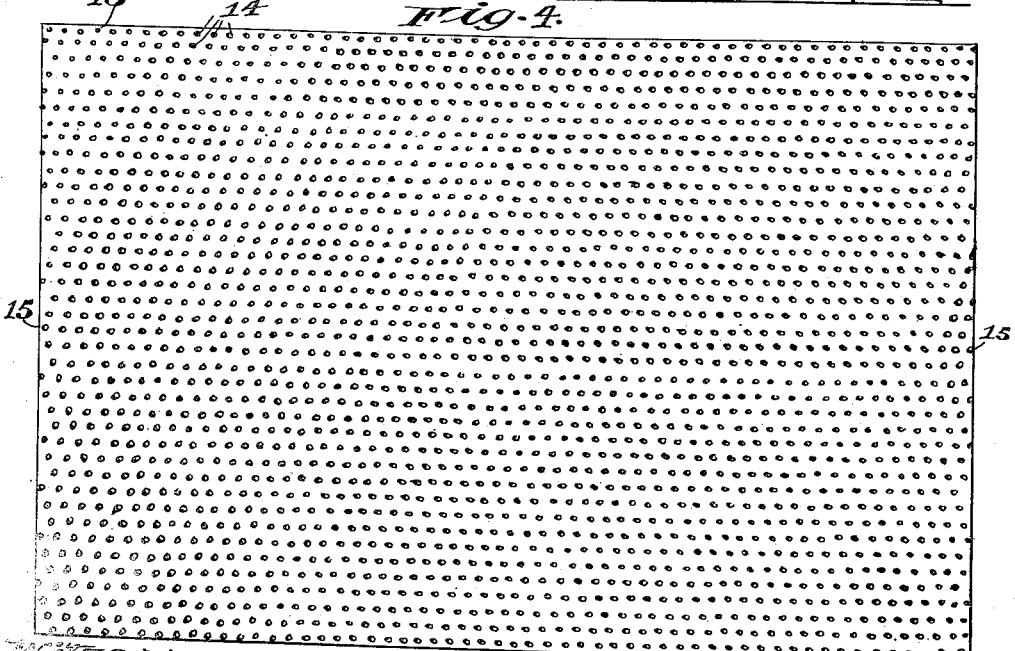

Figure 1 is a top plan view of the complete apparatus. Fig. 2 is a side elevation thereof, viewed from the water return side of the apparatus. Fig. 3 is a cross-sectional view on the offset line 3—3 of Fig. 2, looking in the direction indicated by the arrows. Fig. 4 is a plan detail of the perforated bottom plate of the upper water receptacle, showing a peculiar arrangement of the apertures therein.

In the drawings is shown a rectangular casing or housing comprising the parallel side walls 5 and 6, a top wall or cover 7, and an end wall 8, the opposite end being open for the ingress of the air. In the closed end 8 is fitted a pipe 9 leading to the suction side of any suitable exhaust fan 10, the delivery 11 of which is, in practice, connected to a conduit leading to any desired point of delivery of the purified air.

Near the front or receiving end of the casing and directly below the top or cover 7 is secured a shallow pan or like receptacle 12 for the water, the bottom 13 of which is provided with a large number of minute perforations or apertures 14 designed to shower water therethrough. Fig. 4 shows a detail of the bottom of this pan, from which it will be seen that the apertures are grouped in two series of parallel oblique rows disposed at an obtuse angle to each other and meeting in a line 15 midway between the front and rear edges of the bottom. This arrangement of the apertures in rows oblique to the direction of travel of the air insures the presence of one or more apertures above every point in the underlying passage through which the air is drawn by the fan 10, and thus insures the contact of every particle of air with one or more falling streams of water as the air passes through the space or chamber 16 below the pan.

The floor of the chamber 16 is formed by another shallow pan 17 that has a solid or imperforate bottom; and above this pan I preferably locate a wire-mesh or other screen 17ª which receives the impact of the falling drops or streams of water in a practically noiseless manner. To the outer side of the side wall 5 of the casing, and opposite the pans 12 and 17, are secured water-seals or traps formed by boxes or tanks 18 and 19 provided, opposite the passages 20 and 21 by which said tanks communicate with the pans 12 and 17, with depending guards 22 and 23, respectively, which form a water seal at the inlet and outlet of the purifying chamber, thus preventing the ingress or egress of air at such points.

The means for circulating the water, as herein shown, comprise a centrifugal pump 24, to the suction side of which is connected a pipe 25 communicating with the bottom of the tank 19, while a delivery pipe 26 leads from the discharge side of the pump upwardly to and above the upper open end of the upper tank 18. This manner of delivery of the water into the upper tank is preferred because it is an open visible delivery, and enables the attendant to ascertain at a glance whether or not the water is flowing properly and normally at all times. The shaft of the pump 24 is provided with a pulley 27 by which it may be belted to any suitable or convenient source of power. The tanks 18 and 19 are preferably provided with faucets 28 by which the water may be drawn off as often as it becomes sufficiently soiled or stale to require the re-filling of the system with fresh water. Overflow pipes 29 also preferably tap the tanks at points coincident with or slightly above the normal level of the water therein to take care of any abnormal or accidental excess of water therein.

In the practical operation of the device, the suction blower 10, being started in operation, sets up and maintains a constant and uniform flow of air through the purifying chamber, the air entering at the open end of the casing, as indicated by the arrows in Fig. 2, and being delivered through the blower to the point of use. Simultaneously the water pump 24 is started in operation, and raises part of the water from the lower tank 19 to the upper tank 18, the water in said tanks communicating freely but without ingress or egress of air to the upper and lower pans 12 and 17, the pump being driven at such a speed as suffices to maintain a shallow depth of water under light hydrostatic head in the upper perforated pan 12, from which latter the water falls constantly in a fine shower upon and through the screen 17ª unto the lower pan 17, from which it overflows into the discharging tank 19. By maintaining a body of water in the lower pan 17 into which the shower falls, the objectionable patter and noise which would otherwise result from the falling of the water on a metallic or other hard surface is obviated, the screen 17ª also contributing to this result.

I claim:

1. An air-purifying apparatus, comprising a purifying chamber adapted for the passage of air therethrough, a shallow pan adapted to maintain a light hydrostatic head of water located in the upper portion of said chamber and having a perforated bottom, another pan disposed across the lower portion of said chamber, traps extraneous to said purifying chamber having communication with the latter above said pans and sealed by the water against ingress and egress of air, means for effecting a flow of water from the lower to the upper trap, and means for effecting a flow of air through said chamber wholly between said pans, substantially as described.

2. An air-purifying apparatus, comprising a purifying chamber open at one end for the passage of the air, an air-moving device communicating with the opposite end of said chamber, a pan having a perforated bottom located in the upper portion of said chamber, another pan disposed across the lower portion of said chamber, traps secured externally to one of the side walls of said chamber and communicating with the latter above said pans, said traps being sealed by the water against ingress and egress of air, and means to produce a flow of water from the lower to the upper trap, substantially as described.

3. In an air-purifying apparatus, the combination with a purifying chamber, of means for causing air to flow therethrough, and means for producing a shower of water in said chamber consisting of a plate disposed transversely of the upper portion of said chamber and provided with a plurality of rows of apertures disposed obliquely to the path of travel of the air, and means for supplying water above said perforated plate, substantially as described.

4. In an air-purifying apparatus, the combination with a purifying chamber, of means for causing air to flow therethrough, and means for producing a shower of water in said chamber consisting of an apertured plate disposed transversely of the upper portion of said chamber, the apertures in said plate being arranged in two series of rows disposed obliquely to the path of travel of the air, the rows of the two series being oppositely inclined with reference to the path of the air, and means for supplying water above said perforated plate, substantially as described.

HARRY A. ROBINSON.

Witnesses:
SAMUEL N. POND,
MATTIE B. BLISS.